United States Patent
James et al.

(10) Patent No.: US 11,338,606 B2
(45) Date of Patent: May 24, 2022

(54) OPTICAL SECURITY DEVICE AND METHOD OF MANUFACTURE

(71) Applicant: CCL Secure Pty Ltd, Craigieburn (AU)

(72) Inventors: Randall P. James, Santa Cruz, CA (US); Michael D. Long, Santa Cruz, CA (US); Diana Newcomb, Santa Cruz, CA (US); Gary Fairless Power, Craigieburn (AU)

(73) Assignee: CCL Secure Pty Ltd, Craigieburn (AU)

( * ) Notice: Subject to any disclaimer, the term of this patent is extended or adjusted under 35 U.S.C. 154(b) by 0 days.

(21) Appl. No.: 17/185,302

(22) Filed: Feb. 25, 2021

(65) Prior Publication Data

US 2021/0347193 A1    Nov. 11, 2021

Related U.S. Application Data

(63) Continuation of application No. 16/612,919, filed as application No. PCT/AU2018/050438 on May 11, 2018, now abandoned.

(Continued)

(51) Int. Cl.
*B42D 25/328* (2014.01)
*B42D 25/324* (2014.01)
(Continued)

(52) U.S. Cl.
CPC ......... *B42D 25/328* (2014.10); *B42D 25/324* (2014.10); *G02B 5/1809* (2013.01);
(Continued)

(58) Field of Classification Search
CPC .... B42D 25/328; B42D 25/324; B42D 25/29; B42D 25/351; B42D 25/23; B42D 25/425;
(Continued)

(56) References Cited

U.S. PATENT DOCUMENTS

| 9,176,266 B2 | 11/2015 | Fuhse et al. |
| 9,283,798 B2 | 3/2016 | Jolic |
| 2013/0154251 A1* | 6/2013 | Jolic ........................ G02B 5/32 283/85 |

FOREIGN PATENT DOCUMENTS

| FR | 2963903 | 2/2012 |
| JP | S6113241 | 1/1986 |

(Continued)

OTHER PUBLICATIONS

Search Report for FR1853968 dated Apr. 9, 2020.
(Continued)

*Primary Examiner* — Justin V Lewis
(74) *Attorney, Agent, or Firm* — Christopher M. Scherer; DeWitt LLP

(57) ABSTRACT

A security device is disclosed including a substrate and one or more focusing elements or lens structures located on one side of the substrate. The security device includes a plurality of image elements associated with each focusing element wherein the image elements include at least first and second groups of image elements. Each image element may be composed of pixels located in an object plane to be viewable through the associated focusing element. Each image element comprises a diffractive grating element or sub-wavelength grating element which when illuminated by a light source generates a diffraction image observable at a range of viewing angles around the device. Image elements of the first group are visible in a first range of viewing angles and image elements of the second group are visible in a second range of viewing angles. The security device is particularly suitable for use on security documents, such as banknotes. A method of forming a security device is also disclosed.

19 Claims, 12 Drawing Sheets

Related U.S. Application Data

(60) Provisional application No. 62/622,399, filed on Jan. 26, 2018, provisional application No. 62/505,315, filed on May 12, 2017.

(51) Int. Cl.
| | |
|---|---|
| *G02B 5/18* | (2006.01) |
| *B42D 25/23* | (2014.01) |
| *B42D 25/24* | (2014.01) |
| *B42D 25/29* | (2014.01) |
| *B42D 25/41* | (2014.01) |
| *B42D 25/425* | (2014.01) |
| *B42D 25/21* | (2014.01) |
| *B42D 25/351* | (2014.01) |
| *B42D 25/378* | (2014.01) |

(52) U.S. Cl.
CPC ............ *G02B 5/1842* (2013.01); *B42D 25/21* (2014.10); *B42D 25/23* (2014.10); *B42D 25/24* (2014.10); *B42D 25/29* (2014.10); *B42D 25/351* (2014.10); *B42D 25/378* (2014.10); *B42D 25/41* (2014.10); *B42D 25/425* (2014.10)

(58) Field of Classification Search
CPC ...... B42D 25/41; B42D 25/24; B42D 25/378; B42D 25/21; G02B 5/1809; G02B 5/1842; G02B 5/18
USPC ....... 283/72, 74, 94, 98, 107, 109, 110, 111, 283/901
See application file for complete search history.

(56) References Cited

FOREIGN PATENT DOCUMENTS

| WO | 2015011493 | 1/2015 |
| WO | 2017009618 | 1/2017 |
| WO | 2017194911 | 11/2017 |

OTHER PUBLICATIONS

Opinion for FR1853968 dated Apr. 9, 2020.
International Search Report for PCT/AU2018/050438 dated Jun. 28, 2018.

\* cited by examiner

OPTICAL SECURITY DEVICE AND METHOD OF MANUFACTURE

CROSS-REFERENCE TO RELATED APPLICATIONS

The present application is a continuation of U.S. application Ser. No. 16/612,919, filed Nov. 12, 2019, which application is the U.S. national stage application of International Application No. PCT/AU2018/050438, filed May 11, 2018, which international application was published on Nov. 15, 2018, as International Publication No. WO2018/204982. The International Application claims priority to U.S. Provisional Patent Application No. 62/622,399, filed Jan. 26, 2018, and U.S. Provisional Patent Application No. 62/505,315, filed May 12, 2017, the contents of which are incorporated herein by reference in their entireties.

FIELD OF THE INVENTION

The present disclosure relates to optically variable devices and methods for their manufacture and/or verification. In particular the present disclosure relates to optical devices which include diffractive elements or structures in their construction. More specifically, the present disclosure relates to optical devices which generate an optically variable effect including one or more colour images, and/or monochromatic or grayscale images.

BACKGROUND TO THE INVENTION

Optical security devices are commonly used in connection with valuable documents as a means of avoiding unauthorised duplication or forgery. These security devices typically produce optical effects and/or features which may be difficult for a potential counterfeiter to replicate. The optical effects and/or features may also be used for verification of the valuable documents.

Counterfeiting of banknotes and other valuable documents has become an increasingly important issue in recent times due to ready availability of color photocopiers and computer scanning equipment. This technology provides counterfeiters with an easier route to copying of valuable documents issued using traditional security printing technologies. In response, central banks and banknote printers have turned to technologies and devices which produce images that vary with changing angle of view, and which therefore cannot be easily photographed.

Such devices known collectively as optically variable devices (OVDs), have successfully reduced the incidence of counterfeiting using computer scanning equipment. OVD technologies are able to generate a range of optical effects including moving guilloche and graphic effects. OVD technologies include dot matrix hologram technology (EP 0 467 601 A2), KINEGRAM™ technology (EP 105099, EP 330 738, EP 375 833) first used on Saudi Arabian passports in 1987 and later on Austrian 5000 Schilling banknotes in 1990, CATPIX™ grating technology (PCT/AU89/00542) used on Australian plastics ten dollar banknotes issued in 1988 and Singapore plastics 50 dollar banknotes in 1990, PIXELGRAM™ technology (U.S. Pat. No. 5,428,479), and EXELGRAM™ technology (PCT AU/94/00441) first used on Australian opal stamps and Vietnam bank cheques issued in 1995.

PIXELGRAM™ and EXELGRAM™ technologies display relatively high resolution portraiture effects that change from positive tone to negative tone images as the angle of view is changed. Printed high resolution portraiture has long been used on banknotes as a security feature because of the human eye's ability to perceive errors or defects in an image of a human face. Accordingly PIXELGRAM™ and EXELGRAM™ technologies were developed to include portraiture OVD effects. However, these portraiture effects were limited to near monochromatic images consisting of a fixed number of brightness levels or "greyness" values. PCT application PCT/AU97/00800, published under WO98/23979 entitled Color Image Diffractive Device, the disclosure of which is herein incorporated by cross reference, extended diffractive OVD imagery to generate full color images.

However, there have been limitations and difficulties in displaying diffractive OVD imagery on physical substrates. In particular, surface relief holograms and holographic stereograms viewable under white light suffer blurring and a loss of clarity when viewed with extended (not point) light sources. Regions of the image furthest from the plane of the hologram suffer the worst. This occurs because while vertical parallax has been eliminated to prevent spectral smear, horizontal perspectives which determine dimensionality are sent in incorrect directions by a light source which is even partly diffuse in the horizontal direction. This problem increases under extended or diffuse light sources and with distance above or below the image plane.

Various technologies have been used to create three dimensional images, some of which are based on printing combined with lenticular optics. To date print versions are limited to relatively low resolution. Holographic stereograms based on diffractive OVD imagery are capable of much higher resolution, although without the use of special lighting they generally have limitations as described above.

Holographic stereograms have been produced by Pacific Holographics Inc. and others in the past and one remedy was to compromise by reducing image size and depth. Despite these constraints the results were difficult to view in typical lighting environments.

Hence there is a need to increase security of valuable documents such as polymer banknotes using OVD technology incorporating 3D imagery. These OVD's may use focusing elements such as micro lens arrays, and may incorporate diffractive devices. There is also a need to address the limitations of displaying 3D imagery on physical substrates based on such diffractive devices.

SUMMARY OF THE INVENTION

In broad terms in a first aspect, there is provided a security device comprising:
  a plurality of focusing elements;
  a plurality of image elements associated with each focusing element wherein said image elements include at least a first and a second group of image elements,
    wherein each image element is located in an object plane to be viewable through the associated focusing element,
    wherein each image element comprises a diffractive grating element or sub-wavelength grating element which when illuminated by a light source generates a diffraction image observable at a range of viewing angles around the device, and image elements of the first group are visible in a first range of viewing angles and image elements of the second group are visible in a second range of viewing angles.

In one form, the image elements include three or more groups of image elements to represent an image observable from different viewing angles.

In one form, the diffraction image is a greyscale or monochromatic image that includes a plurality of brightness levels across the image, and/or a color image that includes a plurality of colours.

In one form, each image element comprises red, green and blue sub-elements.

In one form, the red, green and blue sub-elements each includes its own diffractive grating element or sub-wavelength grating element, wherein the frequency and/or the pitch of the diffractive grating elements or sub-wavelength grating elements are different in the red, green and blue sub-elements so that each sub-element produces a predetermined primary colour upon illumination.

In one form, the red, green and blue sub-elements are vertically arranged as a strip.

In one form, the red sub-element located at the top of a vertical strip of grating elements, the green sub-element located in the middle of the strip, and the blue sub-element located at the bottom of the strip.

In one form, the red, green and blue sub-elements are of a same physical size.

In one form, the grating elements of the red, green and blue sub-elements have a size distribution and/or a spatial distribution corresponding to grey levels or brightness levels associated with the sub-element.

In one form, each of the sub-elements includes an effective grating area that includes the diffraction grating element or the sub-wavelength grating element, and a non-diffractive area that does not include any grating elements, and a brightness value of each sub-element is varied by changing the effective grating area within each sub-element and/or the non-diffractive area of the sub-element.

In one form, the non-diffractive area within each of the red, green and blue sub-elements are of a same size for a given image element, to thereby generate a greyscale image, or that the non-diffractive area within each of the red, green and blue sub-elements are of a different size for a given image element, to thereby generate a colour image.

In one form, each image element includes a randomized diffraction grating with a randomized grating pitch and/or width to diffract incident light at different angles, such that incident light diffracted from the diffraction grating is diffused and the diffraction image observable is a greyscale image.

In one form, each image element includes an effective grating area that includes the diffraction grating element or the sub wavelength grating element, and a non-diffractive area that does not include any grating element, and a brightness value of each image element is varied by changing the effective grating area and/or the non-diffractive area of the image element.

In one form, the non-diffractive area includes a microstructured surface with light traps for creating internal reflections of most incident light that then fails to reflect out and away from the light traps.

In one form, the non-diffractive area has a reflective coating for specular reflection of incident light.

In one form, the non-diffractive area has a light absorbing coating.

In one form, the image elements are anamorphic, and more preferably the image elements are configured to have a rectangular shape, meaning that the lengths of the image elements are greater than the widths.

In one form, the resolution of the image elements are 12 times, or 10 times, or 8 times, or 4 times higher vertically than horizontally.

In one form, the diffractive grating element or sub-wavelength grating element is formed from a surface relief structure.

In one form, the image elements are formed from a radiation curable ink.

In one form, wherein the focusing elements are formed from a radiation curable ink by printing and/or embossing.

In one form, the focusing elements include refractive or diffractive part-cylindrical lenses or zone plates.

In one form, the diffraction image observable is a three dimensional image of a scene, object and/or a person In broad terms in a second aspect, there is provided a security device comprising:
  a plurality of focusing elements;
  a plurality of image elements located in an object plane to be viewable through the focusing elements, said image elements including at least first and second groups of image elements,
    wherein each image element includes a surface structured for causing diffuse scattering of incident light, wherein said plurality of image elements are arranged to generate an image observable when illuminated by the incident light, and image elements of the first group are observable in a first range of viewing angles and image elements of the second group are observable in a second range of viewing angles.

In one form, the surface structured for causing diffuse scattering of incident light includes a randomized diffraction grating with a random grating pitch to diffract light of a given wavelength at different angles such that white incident light diffracted from the random diffractive grating is diffused and the image observable is a greyscale image.

In one form, the surface structured for causing diffuse scattering of incident light may include an array of randomly arranged micromirrors which cause incident light to be diffuse scattered in different directions.

In one form, each image element includes an effective grating area that includes the randomized diffraction grating element, and a non-diffractive area that does not include any grating element, and a brightness value of each image element is varied by changing the effective grating area and/or the non-diffractive area of the image element.

In one form, the non-diffractive area includes any one or more of:
  a microstructured surface with light traps for creating internal reflections of most incident light that then fails to reflect out and away from the light traps,
  a reflective coating for specular reflection of incident light, and
  a light absorbing coating.

In one form, the image elements are anamorphic, and more preferably the image elements are configured to have a rectangular shape, meaning that the lengths of the image elements are greater than the widths.

In one form, wherein the resolution of the image elements are 12 times, or 10 times, or 8 times, or 4 times higher vertically than horizontally.

Preferably, the image observable is a three dimensional image of a scene, object and/or a person.

In a third aspect, there is provided a method of forming a security device including the steps of:
  providing a substrate;
  applying a plurality of focusing elements to a first surface of the substrate; and applying a plurality of image elements to an image surface of the substrate including at least a first group of image elements and a second group of image elements, wherein each image element is located in an object plane to be viewable through an associated focusing element, wherein each image element comprises a diffractive grating element or sub-wavelength grating element which when illuminated by a light source generates a diffraction image observable at a range of viewing angles around the device; and wherein image elements of the first group are visible in a first range of viewing angles and image elements of the second group are visible in a second range of viewing angles.

In one form, the method further includes the step of applying a layer of embossable radiation curable ink to the substrate prior to being embossed while soft and curing the ink by radiation to form the one or more focusing elements on one side of the substrate.

In one form, the diffraction image includes a greyscale image, and/or a multi-colour image.

In a fourth aspect, there is provided a security document, including a security device according to either the first or the second aspects, or a security device manufactured according to the third aspect.

In one form, the security element or security device is provided within a window or half-window region of the security document.

In one form, the security document includes a banknote, passport, credit card or cheque.

In one example the image may include a portrait of an object such as a human face and groups of image elements or channels may represent the object from many different viewpoints. Projectional views of the object may be captured so that the final stereogram produces an accurate three-dimensional image of that object. One technique for capturing stereograms is described in an MIT paper entitled "The Generalized Holographic Stereogram" by Michael W. Halle: http://www.media.mit.edu/spi/SPIPapers/halazar/halle91.pdf the contents of which are incorporated herein by reference.

According to the present disclosure, diffractive devices (classical or direct write) and multiple channels are used in place of ink to create much higher resolution images. This allows use of microscopic lenticular structures necessary for currency, high resolution imagery, and "true" colored images. In addition, hybrid 2D/3D computer graphics may be integrated with photographic stereograms.

The one or more aspects of the present disclosure were not previously available because manufacturing an inexpensive clear substrate with micro-lenses was relatively unknown. In any event previous use of multiplexed images with lenticular lenses to form three dimensional as well as animated "Flip" images has historically been limited to printed image elements, which generally only include printed lines or dots.

However, print forms of this technology suffer from resolution limitations due to the nature of ink and the narrow channels required multiplexing the images under lenticular lenses. This requires either thicker and lower resolution lenticular lenses or very crude black and white imagery. 3D Lenticular images created in ink are crude due to resolution limits of commercial printing as this may limit the number of channels, or angular views.

Applicant is not aware of any previous attempt to combine focusing elements for example cylindrical micro-lenses with diffractive stereograms. Diffractive stereograms without the benefit of additional optical elements suffer from limitations as described above.

Any reference herein to a patent document or other matter which is given as prior art is not to be taken as an admission that that document or matter contains information which was part of the common general knowledge at the priority date of any of the claims.

BRIEF DESCRIPTION OF THE DRAWINGS

Specific embodiments of the present invention will now be described by way of example and with reference to the accompanying drawings in which.

DESCRIPTION OF PREFERRED EMBODIMENTS DEFINITIONS

Security Document

Figure 1:
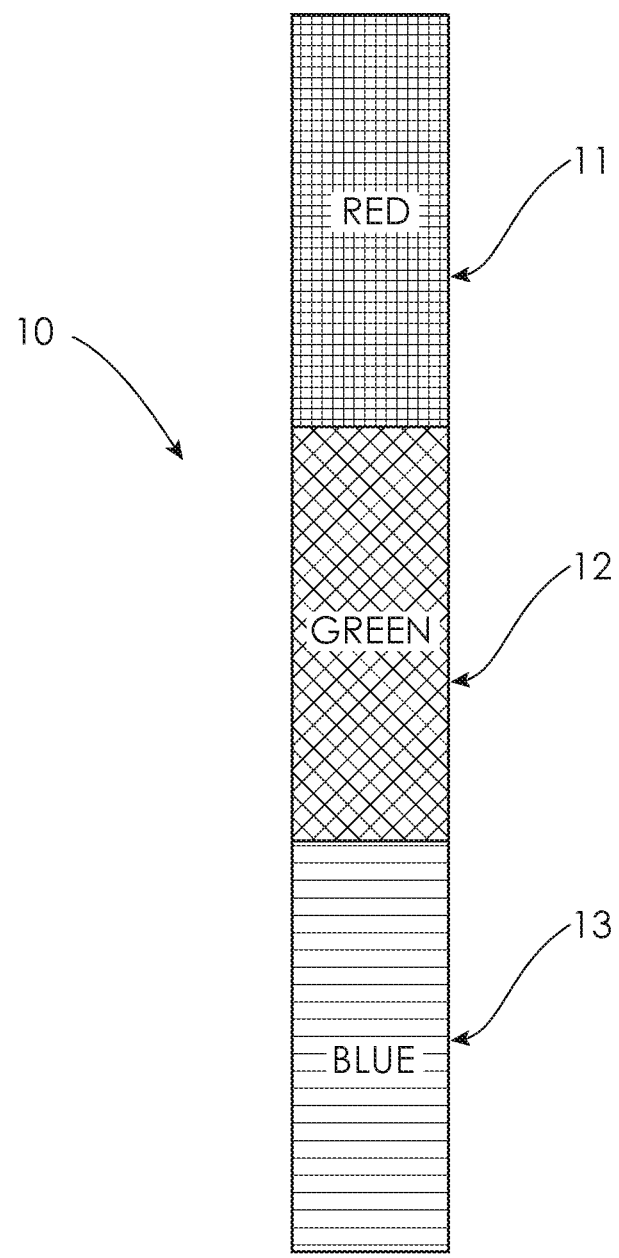
FIG. 1 is a schematic diagram of a pixel of an optically variable diffractive device including three primary color sub-pixels.

As used herein, the term security document includes all types of documents and tokens of value and identification documents including, but not limited to the following: items of currency such as banknotes and coins, credit cards, cheques, passports, identity cards, securities and share certificates, driver's licences, deeds of title, travel documents such as airline and train tickets, entrance cards and tickets, birth, death and marriage certificates, and academic transcripts.

The invention is particularly, but not exclusively, applicable to security documents or tokens, such as banknotes, or identification documents, such as identity cards or passports, formed from a substrate to which one or more layers of printing are applied.

The diffraction gratings and optically variable devices described herein can also have application in other products, such as packaging.

Security Device or Feature

As used herein the term security device or feature includes any one of a large number of security devices, elements or features intended to protect the security document or token from counterfeiting, copying, and alteration or tampering. Security devices or features can be provided in or on the substrate of the security document or in or on one or more layers applied to the base substrate, and can take a wide variety of forms, such as security threads embedded in layers of the security document; security inks such as fluorescent, luminescent and phosphorescent inks, metallic inks, iridescent inks, photochromic, thermochromic, hydrochromic or piezochromic inks; printed and embossed features, including relief structures; interference layers; liquid crystal devices; lenses and lenticular structures; optically variable devices (OVDs) comprising reflective optical structures including reflecting surface relief structures and diffractive devices including diffraction gratings, holograms and diffractive optical elements (DOEs).

Transparent Windows and Half Windows

As used herein the term window refers to a transparent or translucent area in the security document compared to the substantially opaque region to which printing is applied. The window may be fully transparent so that it allows the transmission of light substantially unaffected, or it may be partly transparent or translucent partially allowing the transmission of light but without allowing objects to be seen clearly through the window area.

A window area may be formed in a polymeric security document which has at least one layer of transparent polymeric material and one or more opacifying layers applied to at least one side of a transparent polymeric substrate, by omitting least one opacifying layer in the region forming the window area. If opacifying layers are applied to both sides of a transparent substrate a fully transparent window may be formed by omitting the opacifying layers on both sides of the transparent substrate in the window area.

A partly transparent or translucent area, hereinafter referred to as a "half-window", may be formed in a polymeric security document which has opacifying layers on both sides by omitting the opacifying layers on one side only of the security document in the window area so that the "half-window" is not fully transparent, but allows some light to pass through without allowing objects to be viewed clearly through the half-window.

Alternatively, it is possible for the substrates to be formed from an substantially opaque material, such as paper or fibrous material, with an insert of transparent plastics material inserted into a cut-out, or recess in the paper or fibrous substrate to form a transparent window or a translucent half-window area.

Opacifying Layers

One or more opacifying layers may be applied to a transparent substrate to increase the opacity of the security document. An opacifying layer is such that $L_T<L_O$, where $L_O$ is the amount of light incident on the document, and $L_T$ is the amount of light transmitted through the document. An opacifying layer may comprise any one or more of a variety of opacifying coatings. For example, the opacifying coatings may comprise a pigment, such as titanium dioxide, dispersed within a binder or carrier of heat-activated cross-linkable polymeric material. Alternatively, a substrate of transparent plastic material could be sandwiched between opacifying layers of paper or other partially or substantially opaque material to which indicia may be subsequently printed or otherwise applied.

Embossable Radiation Curable Ink

The term embossable radiation curable ink used herein refers to any ink, lacquer or other coating which may be applied to the substrate in a printing process, and which can be embossed while soft to form a relief structure and cured by radiation to fix the embossed relief structure. The curing process does not take place before the radiation curable ink is embossed, but it is possible for the curing process to take place either after embossing or at substantially the same time as the embossing step. The radiation curable ink is preferably curable by ultraviolet (UV) radiation. Alternatively, the radiation curable ink may be cured by other forms of radiation, such as electron beams or X-rays.

The radiation curable ink is, preferably, a transparent or translucent ink formed from a clear resin material. Such a transparent or translucent ink is particularly suitable for printing light-transmissive security elements, such as sub-wavelength gratings, transmissive diffractive gratings and lens structures.

In one particularly preferred embodiment, the transparent or translucent ink preferably comprises an acrylic based UV curable clear embossable lacquer or coating.

Such UV curable lacquers can be obtained from various manufacturers, including Kingfisher Ink Limited, product ultraviolet type UVF-203 or similar. Alternatively, the radiation curable embossable coatings may be based on other compounds, e.g. nitro-cellulose.

The radiation curable inks and lacquers used herein have been found to be particularly suitable for embossing microstructures, including diffractive structures such as diffraction gratings and holograms, and micro lenses and lens arrays. However, they may also be embossed with larger relief structures, such as non-diffractive optically variable devices.

The ink is preferably embossed and cured by ultraviolet (UV) radiation at substantially the same time. In a particularly preferred embodiment, the radiation curable ink is applied and embossed at substantially the same time in a Gravure printing process.

Focal Point Size H

As used herein, the term focal point size refers to the dimensions, usually an effective diameter or width, of the geometrical distribution of points at which rays refracted through a lens intersect with an object plane at a particular viewing angle. The focal point size may be inferred from theoretical calculations, ray tracing simulations, or from actual measurements.

Focal Length f

In the present specification, focal length, when used in reference to a micro lens in a lens array, means the distance from the vertex of the micro lens to the position of the focus given by locating the maximum of the power density distribution when collimated radiation is incident from the lens side of the array (see Miyashita, "Standardization for micro lenses and micro lens arrays" (2007) Japanese Journal of Applied Physics 46, p 5391).

Gauge Thickness t

The gauge thickness is the distance from the apex of a lenslet on one side of the transparent or translucent material to the surface on the opposite side of the translucent material on which the image elements are provided which substantially coincides with the object plane.

Lens Frequency and Pitch

The lens frequency of a lens array is the number of lenslets in a given distance across the surface of the lens array. The pitch is the distance from the apex of one lenslet to the apex of the adjacent lenslet. In a uniform lens array, the pitch has an inverse relationship to the lens frequency.

Lens Width W

The width of a lenslet in a micro lens array is the distance from one edge of the lenslet to the opposite edge of the lenslet. In a lens array with hemispherical or semi-cylindrical lenslets, the width will be equal to the diameter of the lenslets.

Radius of Curvature R

The radius of curvature of a lenslet is the distance from a point on the surface of the lens to a point at which the normal to the lens surface intersects a line extending perpendicularly through the apex of the lenslet (the lens axis).

Sag Height s

The sag height or surface sag s of a lenslet is the distance from the apex to a point on the axis intersected by the shortest line from the edge of a lenslet extending perpendicularly through the axis.

Refractive Index n

The refractive index of a medium n is the ratio of the speed of light in vacuum to the speed of light in the medium. The refractive index n of a lens determines the amount by which light rays reaching the lens surface will be refracted, according to Snell's law:

η*Sin (a)=n*Sin (θ), where a is the angle between an incident ray and the normal at the point of incidence at the lens surface, θ is the angle between the refracted ray and the normal at the point of incidence, and η is the refractive index of air (as an approximation η may be taken to be 1).

Lobe Angle

The lobe angle of a lens is the entire viewing angle formed by the lens.

Abbe Number

The Abbe number of a transparent or translucent material is a measure of the dispersion (variation of refractive index with wavelength) of the material. An appropriate choice of Abbe number for a lens can help to minimize chromatic aberration.

Sub-Wavelength Grating Element

A sub-wavelength grating element is a grating element having a period or spacing between grating lines that is less than the wavelength, so that the dominant diffracted mode is in the zero-order. Effective properties may be independent of the period, as long as it is sufficiently sub-wavelength. Properties may also be tolerant to structural deformations.

Image Pixel and Sub Image Pixel

Throughout the description terms such as image element(s) and image pixel(s) are used interchangeably and they are intended to have the same meaning. Terms such as sub pixels, sub image pixels, and sub elements are also intended to have the same meaning as each other and used interchangeably.

RGB (Red, Green, Blue) Color Space

A broad range of colors may be constructed with three primary colors Red, Green and Blue. Any color image may be decomposed into three images comprising these primary colors. Each color image may have many intensity levels of brightness. For example if 16 levels of brightness are chosen for each primary color, 4,096 different colors may be produced.

An OVD device may create a portrait in the same way as a video monitor may display a portrait or image on a screen which decomposes the image into many elements or pixels. Referring to FIG. 1 of the drawings a single image element or image pixel 10 is shown which includes red (R), green (G) and blue (B) sub-elements, or sub-pixels, 11, 12, 13 to provide the three primary colors with different brightness values. This mechanism may allow a wide range of colors to be reproduced with various values of hue or color and intensity or brightness. If image elements are produced with primary colors of various brightness, full color images may be readily created. RGB is a specific example of one particular color space, which is used in embodiments described below, but other color spaces, including grayscale and/or single color systems, are also applicable to all embodiments of the invention.

Figure 2:
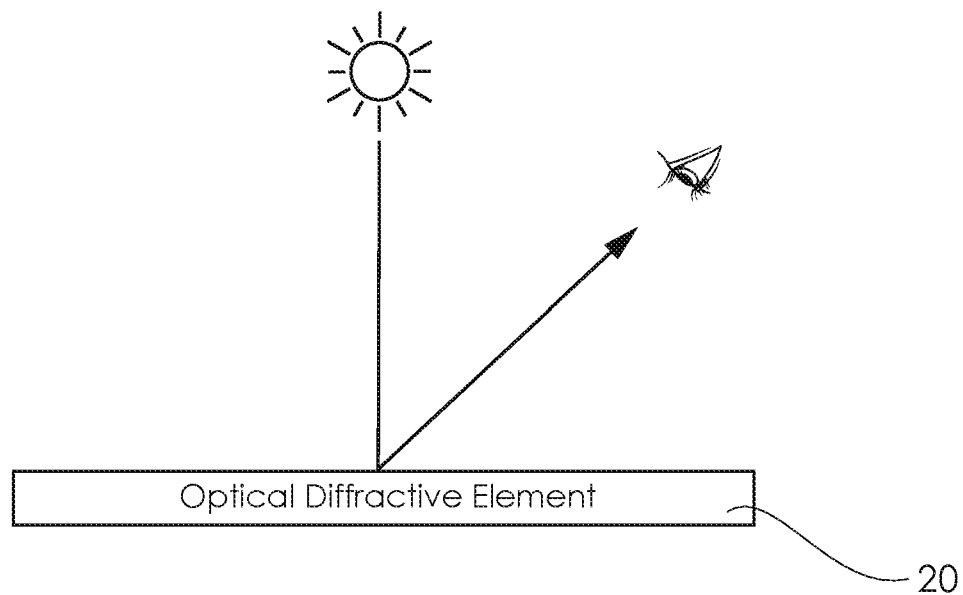
FIG. 2 is a schematic diagram of the manner in which a diffractive surface relief structure diffracts incident light.

Referring to FIG. 2 when a diffractive image element 20 with grating period (or spatial frequency) d is illuminated by a collimated white light beam in normal incidence, light with different wavelengths, λ (or color) is diffracted into different angles, a which are governed by the equation:

$$\sin\alpha = \frac{\lambda}{d} \qquad (1)$$

Here only the first order of diffraction is considered because most light energy is diffracted into the first order. If only single spatial frequency gratings are fabricated within a pixel of an OVD, the OVD produces monochromatic images. When a person observes an image on an OVD, there is usually a fixed incidence angle (direction of light source) and a fixed angle of observation assuming the observer does not move too much. Therefore the viewing angle α is relatively fixed.

Figure 3:
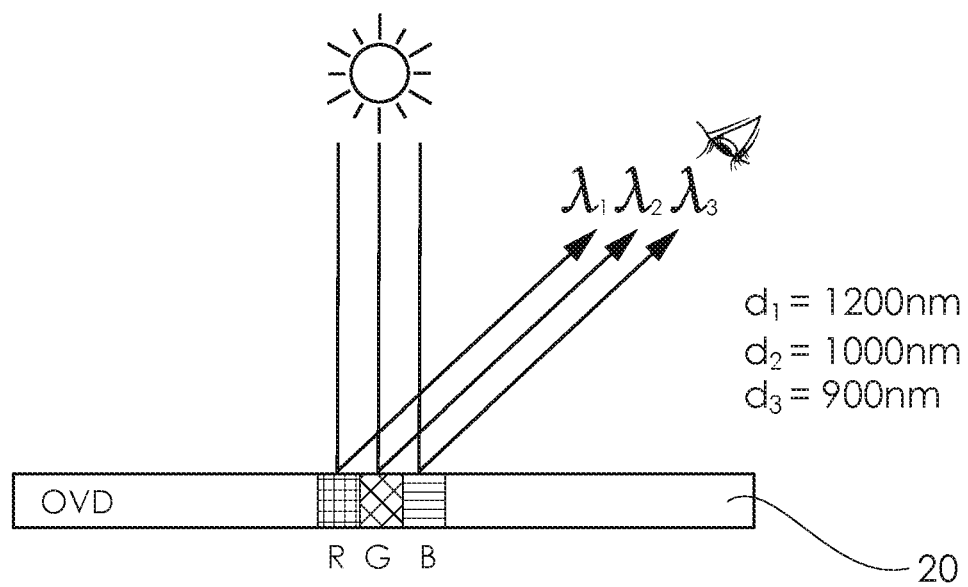
FIG. 3 is a schematic diagram of a mechanism of a full color diffractive device.

From equation (1) outgoing diffracted light in various wavelengths or colors may be achieved by varying d, the period of the gratings. We are mainly interested in the three primary colors Red, Green and Blue having corresponding wavelengths $\lambda_1$, $\lambda_2$ and $\lambda_3$. They may be diffracted by gratings in three color sub-elements or sub-pixels having respective period $d_1$ $d_2$ and $d_3$ as shown in FIG. 3. When the gratings are illuminated by white light, such as a fluorescent tube, at the same viewing angle α, colored light is diffracted from these sub-pixels according to the equation:

$$\sin\alpha = \frac{\lambda_1}{d_1} = \frac{\lambda_2}{d_2} = \frac{\lambda_3}{d_3} \qquad (2)$$

For example, three primary colors with wavelengths $\lambda_1$=600 nm, $\lambda_2$=500 nm and $\lambda_3$=450 nm, and a viewing angle α=30 degrees, correspond to grating periods $d_1$=1200 nm, $d_2$=1000 nm and $d_3$=900 nm for each sub-pixel 11-13 making up each pixel 10.

It should be appreciated that other combinations of incident angle, viewing angle and grating periods may be chosen other than what is disclosed above, so long as they satisfy the diffraction equation of $d(\sin\theta_m + \sin\theta_t) = m\lambda$ wherein $\theta_i$ is the angle at which the light is incident, $\theta_m$ is the viewing angle, d is the separation of grating elements, and m is the diffraction order.

Figure 4:
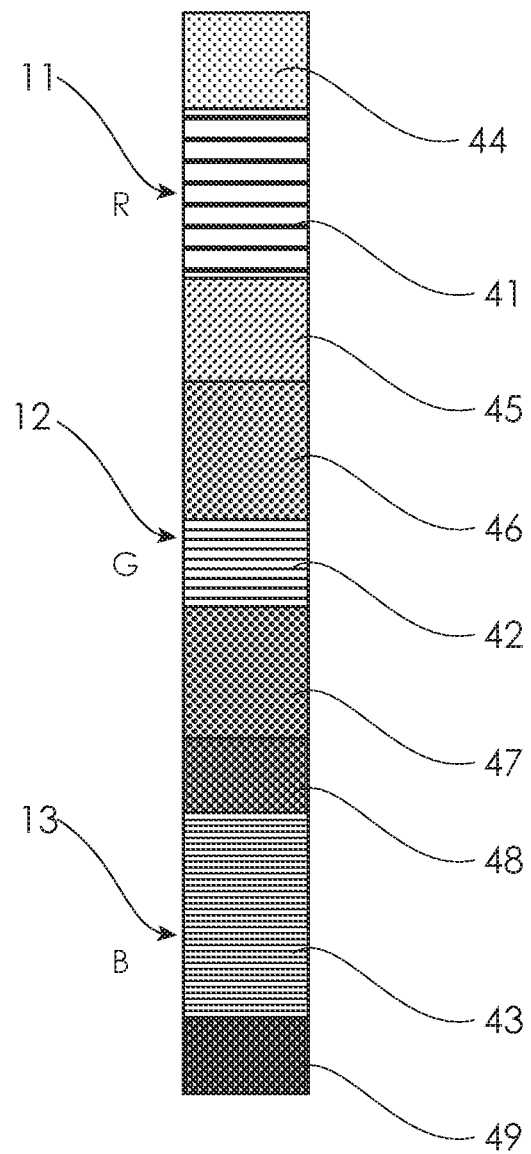
FIG. 4 shows one method of controlling brightness of primary color sub-pixels.
Figure 5:
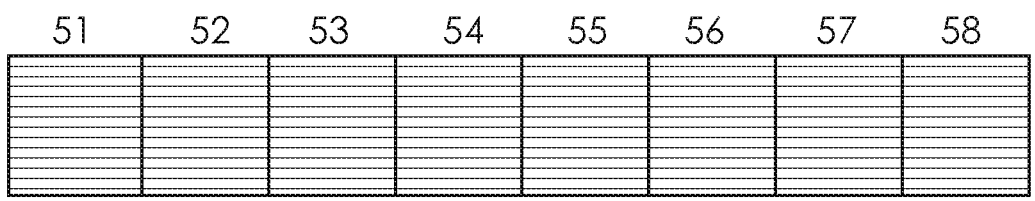
FIGS. 5A and 5B show another method of controlling brightness of primary color sub-pixels.
Figure 5:
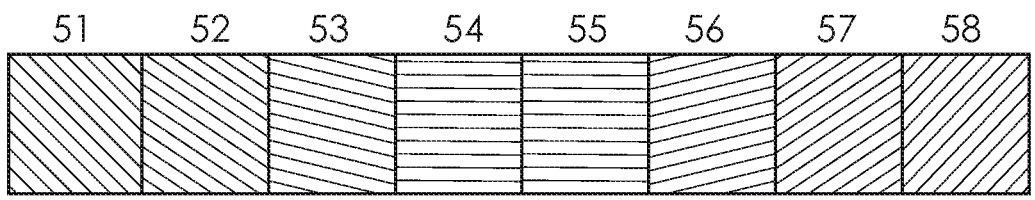

The three primary colors (RGB) are created by gratings in three spatial frequencies. In order to manipulate hue to achieve full color, the brightness value of each primary color from the sub-pixels must also be controlled. There are many methods to control brightness of diffracted light from regions on the surface of an OVD, such as varying grating depth, grating profile and/or grating curvatures. FIGS. 4 and 5 illustrate two methods of controlling brightness of RGB sub-pixels 11-13.

In FIG. 4 the brightness value of each sub-pixel 11-13 is varied by changing the effective area of gratings within each sub-pixel. FIG. 4 shows a single image pixel comprising RGB sub-pixels 11, 12, 13, wherein the effective area of gratings of each sub-pixel 11-13 is adjusted in height or area to represent a particular value of brightness.

In each sub-pixel 11, 12, 13, the brightness of diffracted light is proportional to the area of each diffracting structure 41-43 associated with the respective sub-pixel 11-13. In other words the brightness is proportional to the heights or areas of the diffracting structures 41-43, as distinct from flat areas 44-49 associated with the sub-pixels 11-13 which have an absence of diffracting structures. One advantage of this arrangement is that brightness of sub-pixels 11-13 may be substantially linearly related to the heights or areas of diffracting structures 41-43.

FIGS. 5(*a*) and 5(*b*) illustrates another method of controlling brightness of each primary color sub-pixel. This is done by using a set of palettes wherein the diffracting structures are oriented in variable directions to determine various levels of brightness. FIG. 5(*a*) shows 8 sub-pixels 51-58 oriented at 90 degrees corresponding to the highest brightness value within the palette set. FIG. 5(*b*) shows 8 sub-pixels 51-58 oriented at various angles with a corresponding variation in brightness value within the palette set between a highest (90 degrees) and a lowest (45 degrees) brightness value. It is also possible to combine techniques for controlling brightness. For example, using a change in orientation of the diffraction grating to compensate for a drop off in brightness of outer channels due to lens aberrations.

The structures described above may produce a single channel full color image wherein a "single channel" image is the only diffractive image produced by the surface relief structure. Multi-channel OVD's (that is, diffractive devices which generate more than one diffraction image) are desired for stereoscopic applications wherein different images are observable from different viewing angles. For example "X" number of channels may be required to observe stereoscopic portraiture, wherein each channel represents a different viewing angle associated with the portraiture.

Spatially divided space may be one way to achieve multi-channel OVD devices. A notional element or pixel region on the device may be divided into a plurality number of channels wherein each channel contains three color sub-elements or sub-pixels for red, green and blue.

Figure 6:
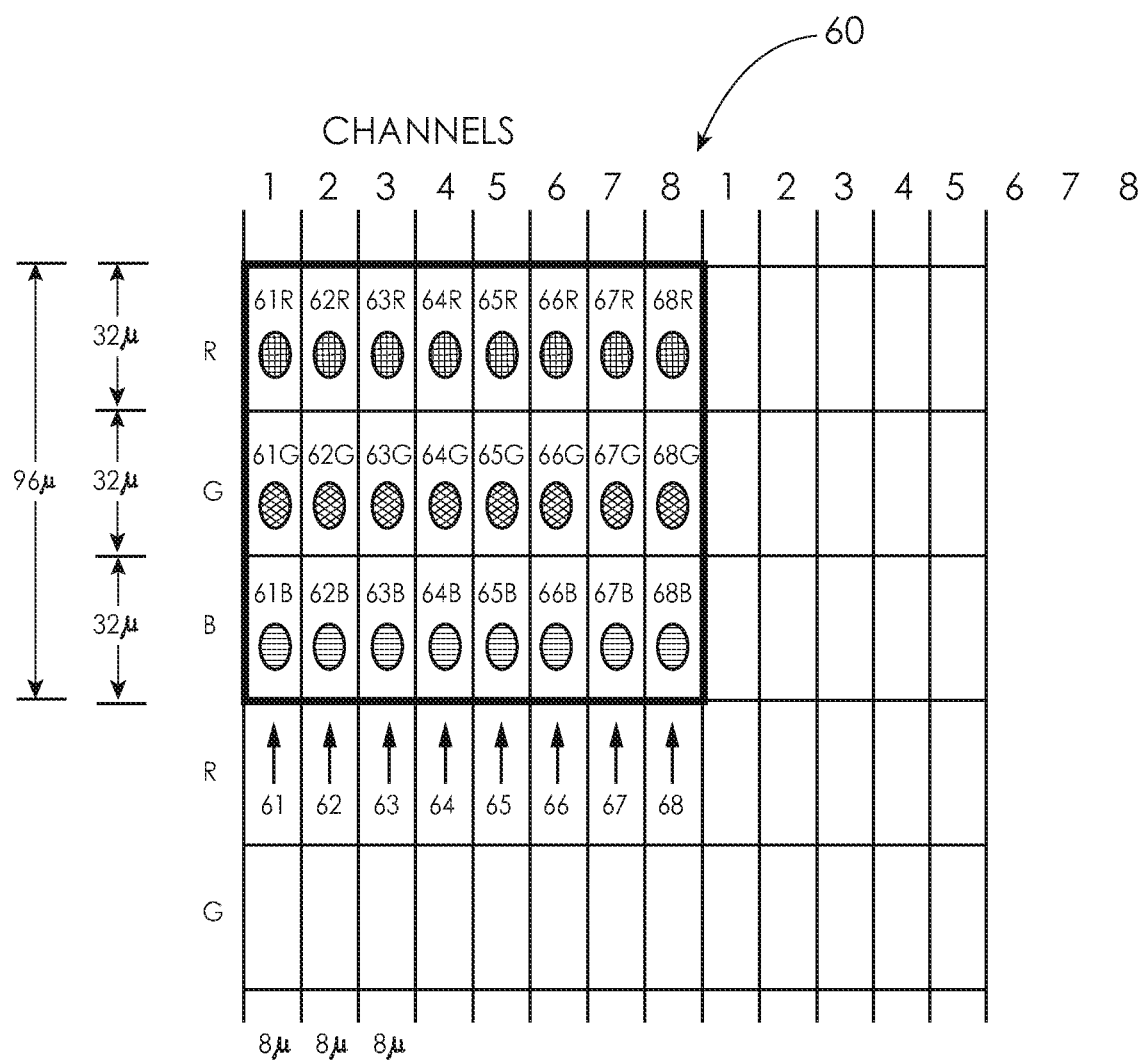
FIG. 6 shows an example of an eight-channel OVD pixel structure.

FIG. 6 shows an example of a RGB element or pixel structure 60 for an eight-channel full color OVD. RGB pixel structure 60 includes anamorphic image pixels 61-68, with each entire image pixel 61-68 being represented by a trio of RGB sub-pixels 61R-68R, 61G-68G, 61B-68B arranged vertically in strips. In the example given, each image pixel 61-68 has a vertical dimension of 96 μm and a horizontal dimension of approximately 8 μm, such that the resolution of each image pixel 61-68 is 12 times higher horizontally than vertically.

It should be appreciated that the physical dimensions of the image pixels are generally determined by the number of image channels underneath each lens, and the pitch of the focusing elements such as lenticular lenses. The horizontal dimension of the image pixels can be anywhere between 4 and 10 microns, and the vertical dimension of the image pixels can be in the range of 45 to 100 microns. The number of image channels can be anywhere between 2 image channels to 16 image channels.

It should also be appreciated that the projected diffractive imagery observable by a viewer is determined by the image content stored in each image channel. For example, if the image content stored in each image channel is closely associated with the image content stored in other image channels, with each image channel representing a view of an object from a certain viewing angle, the device can be configured to project a three dimensional view of that object to the viewer. It is also possible to achieve other types of diffractive optical effects, such as animation, morphing, zooming in and/or out, image switching and so on, as the viewing angle changes.

In a most preferred embodiment, the multiple image channels are arranged to generate a true colour of an image at a predetermined viewing range. The present disclosure offers an OVD which has many advantages over the conventional diffractive or lens structures which include:

The OVD feature works in a wide range of lighting condition, including diffuse lighting and low light environment.

The feature produces a sharp, well defined image compared with stereogram images generated by other methods.

The OVD produces vibrant diffractive effects and can be configured to produce true colour mixing effects.

The OVD overcomes the limitations associated with traditional printing technologies and lenticular features.

Extremely high resolution, well beyond the capability of most printers, is required to form the multiple channels, such as 4-channel, 8-channel, 10-channel, or even 12-channel under lenticular lenses used on documents such as banknotes. As mentioned above, the horizontal resolution of the image pixels can be as small as 4 microns, whereas with traditional printing methods such as gravure and offset printing, due to limited printing resolution that inherently exists for any printing method, it is either impossible or extremely difficult to print image elements that have a resolution of less than 30 to 40 microns.

One means of representing RGB images may yield essentially square sub-pixels subdivided into vertical columns of RGB wherein the entire sub-pixel would have the same resolution in both directions, although RGB sub-pixel divisions require higher resolution.

In the example shown in FIG. 6, the width of each channel is 8 microns, so this would result in sub-pixels 8 microns high, if square sub-pixels were used. As the sub-pixels are composed of diffractive gratings with a repeat on the order of 1 micron, only 8 grating lines could be recorded in such a sub-pixel. When the height of each diffractive area is adjusted as described above to represent the brightness value of each image sub-pixel, this would limit the range of brightness values that could be represented. If a broad range of brightness values is to be represented, more diffractive grating lines must be used. Hence the image sub-pixels are chosen to be anamorphic, such as each being up to 4 times taller than wide.

Greyscale Color Space

Figures 7A, 7B:
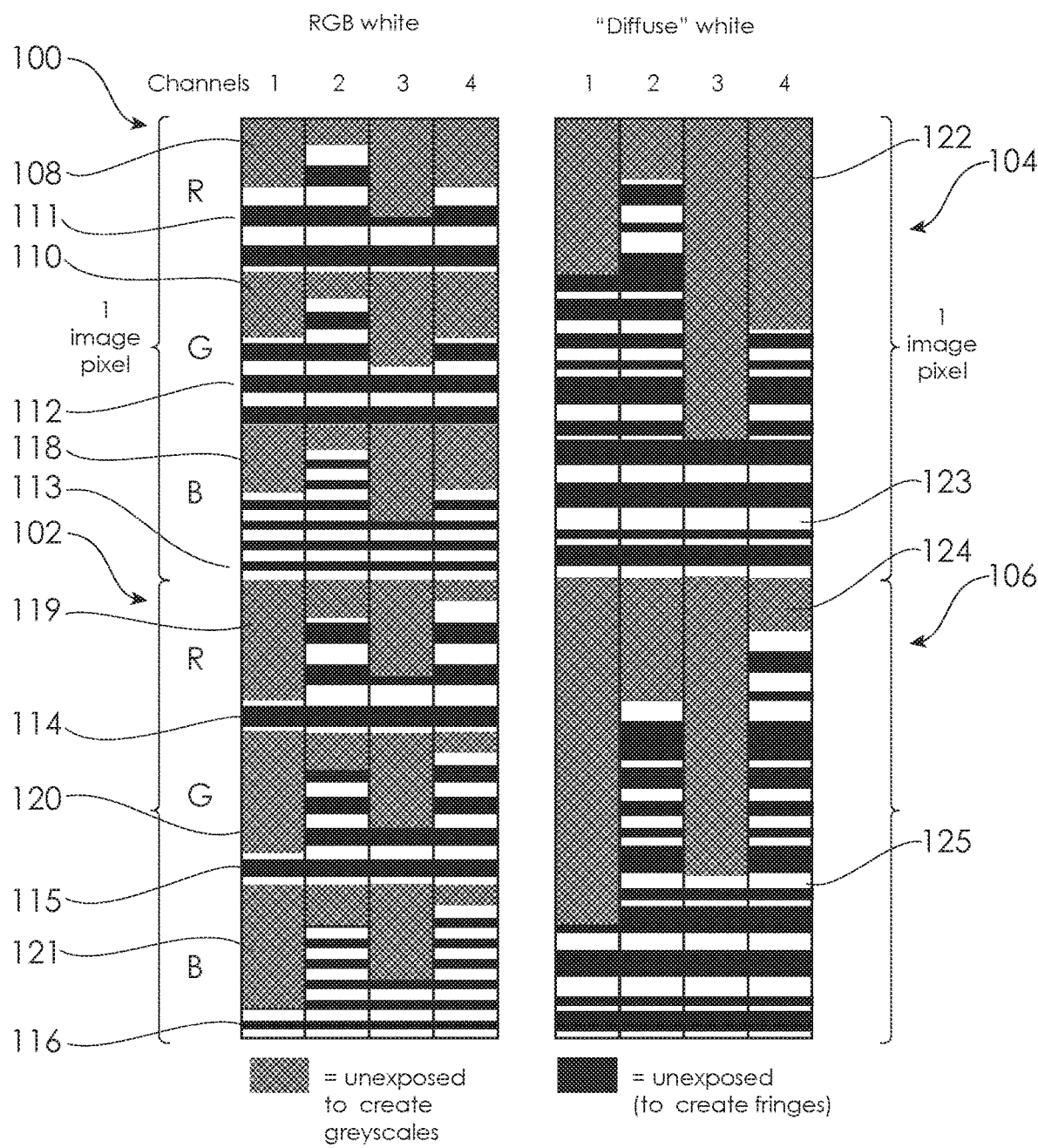
FIGS. 7A and 7B are schematic diagrams of two different forms of pixel for generating a grayscale image.

In some circumstances, it may be desirable to generate 3D imagery depicting a greyscale image. One way of generating a greyscale image is to balance the brightness levels between the red, green and blue subpixels such that the net impression to the viewer, from the portion of the subpixels having diffractive structures, is a mixture of the incoming colors (which for daylight, would be nominally white) and, from the entire RGB pixel, a desired greyscale level which together with the remaining pixels generate a greyscale image. This situation is shown in FIG. 7A depicting the diffractive imagery layer beneath a portion of a single lenticular lens. The imagery layer has a four-channel structure with two adjacent image pixels shown for each of the four channels.

Referring to channel 1, the adjacent pixels 100 and 102 each have red, green and blue subpixels (111, 112, 113 and 114, 115, 116, respectively). Each of these subpixels has a non-diffractive area used to vary the brightness level (108, 110, 118, and 119, 120, 121, respectively). In this example, to balance the brightness level between each of the RGB subpixels, the non-diffractive areas 108, 110 and 118 are of the same size. Likewise, the non-diffractive area 119, 120 and 121 in pixel 102 are also equally sized. As the non-diffractive areas in pixel 100 are smaller than those in pixel 102, the pixel 100 has a greater brightness level than that of 102. This variation in brightness level is used to generate the desired greyscale image. For example, it is clear from FIG. 7A that the upper pixel in channel 2 and the lower pixel in channel 4 all have the smallest non-diffractive areas and therefore the highest brightness levels. The greyscale image, in this case, is viewable at a specified viewing angle coincident with the $1^{st}$ diffraction order of the RGB subpixels, which are of course designed to be substantially the same, as explained above.

Diffuse White

Alternatively, the 3D greyscale imagery may be generated by pixels with a portion having a surface structure for diffuse scattering of incident light and the remaining portion being sized to correspond with a predetermined brightness level. The diffuse scattering may be provided by a surface structure with suitable roughness or, preferably, is provided by a random diffractive grating structure schematically illustrated in FIG. 7B. As with FIG. 7A, FIG. 7B shows the imagery layer beneath part of a single lenticular lens. Two adjacent image pixels are shown for each of the 4 channels. Referring to channel 4, the adjacent pixels 104 and 106 have a randomized diffractive grating 123 and 125 respectively and the non-diffractive areas 122 and 124 respectively. The randomized (or pseudo-randomized) diffractive gratings 123, 125 each have a grating pitch and/or width that varies in a random manner. As the incident light is diffracted from each of the adjacent fringes within the grating, the angle of the respective zero order, first order etc. diffractive fringes (lines of positive interference) are generated for each different wavelength at different angles to the grating. Since the grating pitch is randomized, so too is this angle of diffraction (importantly, the first order diffraction) for each wavelength of visible light, effectively creating a diffuse reflection of the incident light. Hence the viewer sees a random or pseudo-random combination of numerous different wavelengths which the eye combines as white light. As discussed above, the variance in non-diffractive areas of the diffuse light pixels 104, 106 enable a variance in brightness so that a greyscale image can be generated.

Figure 8A:
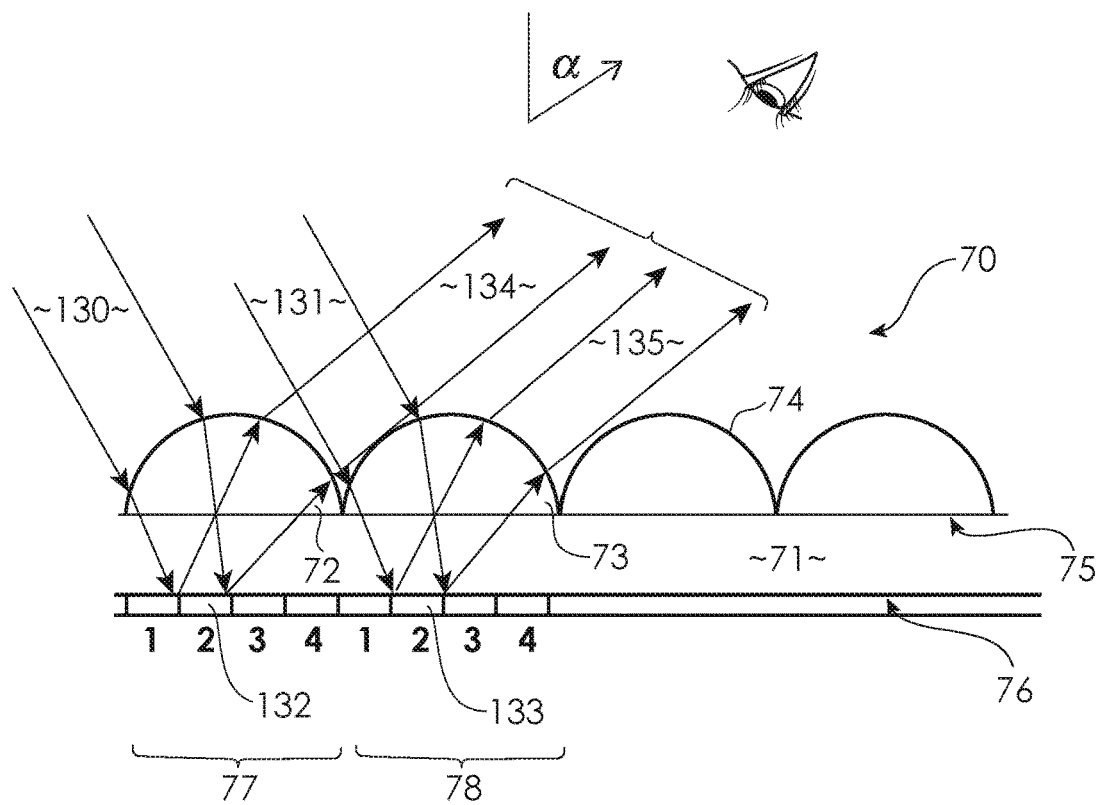
FIGS. 8A and 8B are schematic diagrams of the operation of the grayscale pixel shown in FIG. 7B.
Figure 8B:
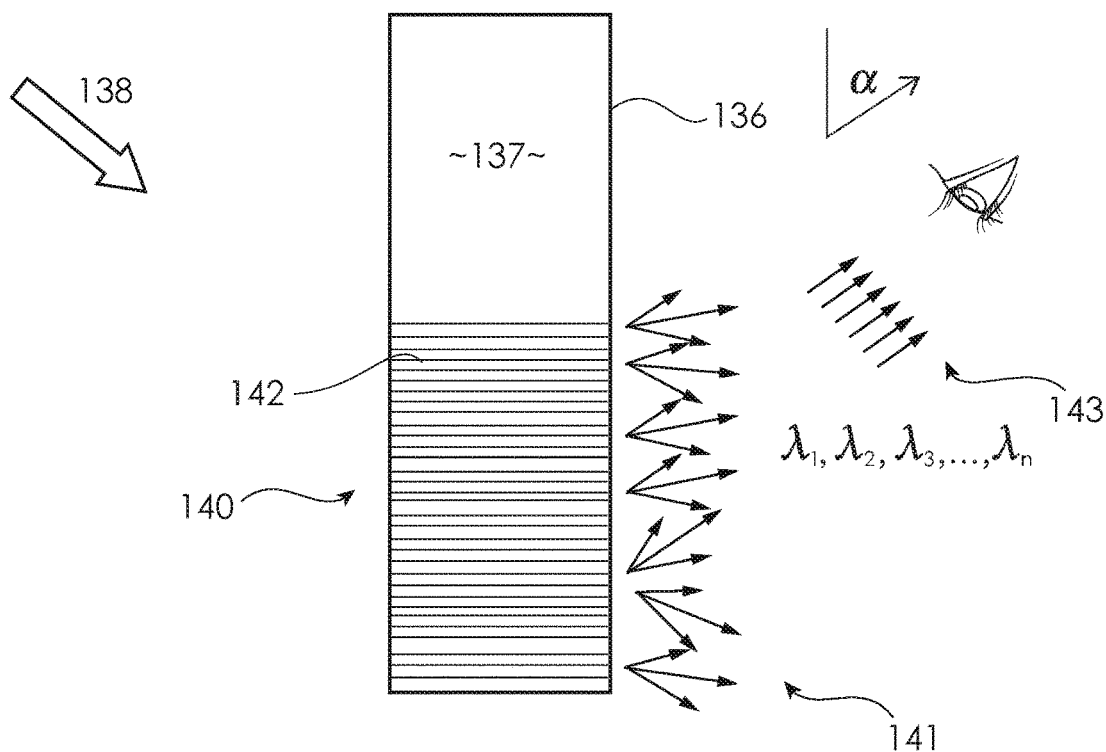

FIGS. 8A and 8B provide a schematic representation of an example of this effect. FIG. 8A is a schematic section view of the security device 70. White light 130, 131 is incident on the focusing elements in the form of lenticular lenses 72, 73, 74. Lenticular lenses 72, 73, 74 are supported on one surface 75 of the transparent substrate 71 while the image elements 77 and 78 are formed on the opposite surface 76 to provide a 4 channel OVD.

The lens geometry is such that parallel incident rays 130 are refracted to a focal strip 132 encompassing the strip of pixels 132 within channel 2. Similarly the parallel rays of incident light 131 are focused by lens 173 to the strip of pixels 133 in channel 2 of the adjacent image elements 78. Ideally the width of the focal strips 132 and 133 should correspond to the width of the pixels, which is achieved via selection of the appropriate lens geometries and/or substrate thickness.

The light focused onto the focal strips 132 and 133 covering the channel 2 pixels is diffracted out of the respective lenses 72 and 73. At viewing angle α, the diffracted light 134, 135 is that of the greyscale pixels for channel 2, each with a brightness level determined by the size of their respective non-diffractive surfaces. In this way, the combination of light from channel 2 pixels 134, 135 etc. combine to create a greyscale image seen by the viewer.

Referring to FIG. 8B, a single image element or pixel 136 is schematically shown. Each pixel 136 has a surface area 140 with a surface 142 structured for diffuse diffraction of the incident light. In the embodiment of FIG. 8B, the structured surface is a randomized (or pseudo-randomized) diffractive grating in which the grating pitch and/or width is random. In one particular form, the UV curable polymer forming the image layer is structured, using known techniques such as UV embossing or casting, to create a grating of parallel lines with a random width and a random spacing within a fixed range of widths and spacings.

The incident white light 138 diffracts from the random grating 142 and forms diffraction patterns from each grating line. As the grating pitch is random, so too is the angle of diffraction at which the zero order, first order, second order, and so on, for each wavelength in the white light 138. This random dispersion of the zero order, first order, second order and so on, diffraction angles 141 means that viewing the pixel 136 from viewing angle will see a random collection of wavelengths 143 ($\lambda_1$ to $\lambda_n$). As these wavelengths are drawn from the full spectrum of visible light, assuming that the incident light includes the full spectrum of visible light, the viewers eye combines the different wavelengths to see white light or a close approximation to white light.

The brightness level of the white light 143 seen by the viewer is determined by the extent of the non-diffractive area 137. The surface of the non-diffractive area 137 may be flat and unstructured such that the incident light 138 will predominately pass through. However, the non-diffractive surface area may also have a coating such as a reflective metallic coating. In this case, the incident light 138 would be specularly reflected at an angle of reflection equal to the angle of incidence. When viewing the device from that angle, the specular reflection of incident light overpowers the light diffracted from the randomized diffraction grating 142 and the device would appear bright white without any discernable greyscale image. At other viewing angles however, there would be the necessary contrast between the diffusely diffracted light from the randomized grating 142 and the non-diffractive surface area 137 in order to create the greyscale image.

The non-diffractive surface area 137 may also be structured using, for example UV casting or embossing techniques and/or coated in order to increase light absorption. Light traps or so called 'moth-eye' structures, which are described in detail throughout WO2005106601, are suitable surface microstructures for this purpose. In this case, the non-diffractive surface area 137 reflects very little of the incident light 138 regardless of the incident angle and provides a strong contrast with the diffusely diffracted light 141 from the randomized grating 142. Furthermore, microscopic light trap structures may be embossed into the non-diffractive surface 137 using the same casting or embossing tool that embosses the randomized diffraction grating 142 such that both sets of surface structures are in exact register.

As discussed above, in relation to the RGB color space embodiment, the brightness value of each pixel 136 is varied by changing the size of the non-diffractive surface area 137.

Increasing the size of the non-diffractive surface area 137 decreases the size of the randomized diffractive grating 142 (assuming pixel size 15 constant). Therefore the brightness level of the light 143 from pixel 136 will also decrease.

Pixels with a surface area structured for diffuse scattering of the incident light to create 3D grayscale images, offer a broader range of viewing angles in which the grayscale image is seen in the intended diffuse color (i.e. white in normal diffuse white incident light). As discussed above, the images generated by the red, green and blue subpixel embodiments show a true color version of the image at a narrow range viewing angles only. At other viewing angles, the image is still visible but not in true color, instead the image varies according to the diffractive spectrum of the RGB pixels.

A further advantage of the grayscale diffuse pixel embodiments is the improved image resolution relative to RGB subpixel embodiments. The combined area required for the R, G and B sub-pixels, is greater than that required for embodiments using a randomized diffraction grating and a single non-diffractive area. Therefore the overall pixel size of the diffuse pixels may be less than one third of the size of the RGB color pixels. Reducing the pixel size allows the image to have more pixels which improves image resolution. That is, whilst the diffuse light pixels 104, 106 are shown at a size comparative to the entire RGB pixel, they can be the same size as an individual R, G or B subpixel, or even smaller.

A difference in image resolution is not an obstacle to an OVD in which one group of the image elements are diffuse pixels for creating a grayscale image and another group of the image elements are RGB pixels for a color image, possibly the same image as the grayscale.

Production Techniques

Figure 9:
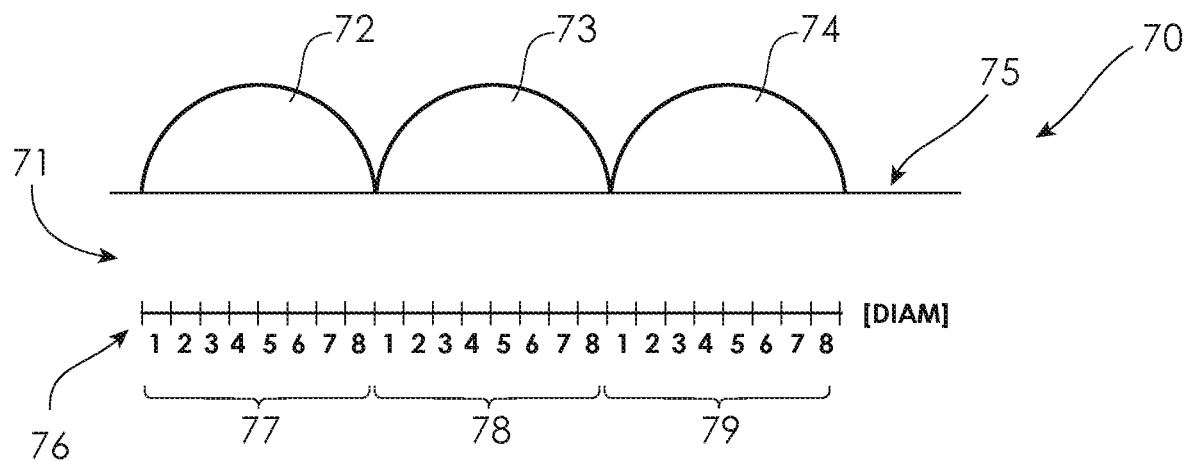
FIG. 9 shows a cross sectional view of an optical security device incorporating an eight-channel OVD structure according to one embodiment of the present disclosure.

FIG. 9 shows a cross sectional view of an optical security device 70 incorporating an eight-channel OVD structure. Optical security device 70 includes a layer of embossable radiation curable ink applied to a transparent or windowed area of substrate 71 prior to being embossed, while still soft, to form refractive lenticular focusing structures 72-74 on one side 75 of substrate 71. Each focusing structure 72-74 may include a refractive cylindrical lens.

The ink may be cured by radiation to fix the embossed lenticular focusing structures 72-74. Each focusing structure 72-74 is formed such that its focal length is approximately equal to the distance to the opposite side 76 of substrate 71. In some instances, it may be desirable to have lens which are do not focus exactly on the image plane (see WO2010099571, which is hereby incorporated by reference) Each focusing structure 72-74 facilitates detecting image elements 77-79 located on the opposite side 76 of substrate 71.

The image elements 77-79 may be formed by radiation curable ink, through embossing into a layer of such ink, or by printing of the radiation curable ink in the desired pattern.

It is noted that the above method is the preferred method of creating suitable lenses and image elements but other methods may also be appropriate.

The above arrangement may produce an optical effect similar to lenticular based optical variable devices and may be visible to the eye through lenticular structures 72-74 located to detect diffractive image elements 77-79 on the opposite side 76 of substrate 71. Each image element 77-79 includes an eight-channel OVD structure 60 comprising image pixels 61-68 (strips) as described above with reference to FIG. 6. Each set of image pixels 61-68 belongs to a distinct image or channel, so that as an observer viewing the device changes the angle of view, a different image or channel becomes visible. Each image or channel may represent a full color portrait from one of eight different viewpoints. The net impression on a viewer emerging from viewing eight different viewpoints is to generate a stereogram of the image with an added benefit of separation via lenticular focusing structures 72-74.

Figure 10:
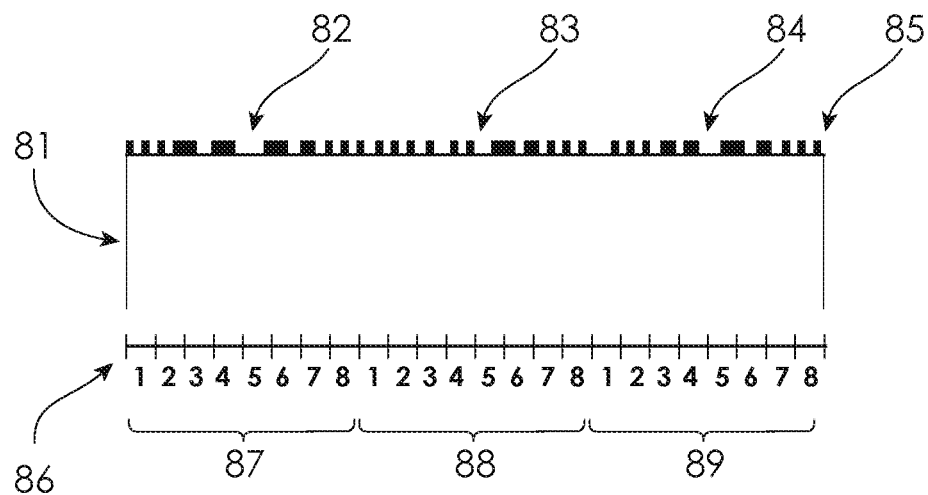
FIG. 10 shows a cross sectional view of an optical security device according to another embodiment of the present disclosure.

FIG. 10 shows a cross sectional view of an optical security device 80 incorporating an eight-channel OVD structure. Optical security device 80 includes a layer of embossable radiation curable ink applied to a transparent or windowed area of substrate 81 prior to being embossed while soft to form diffractive lenticular focusing structures 82-84 on one side 85 of substrate 81. Each focusing structure 82-84 may include a diffractive cylindrical lens or zone plate.

The ink may be cured by radiation to fix the embossed lenticular focusing structures 82-84. Each focusing structure 82-84 may be formed such that its focal length is equal to the distance to the opposite side 86 of substrate 81. Each focusing structure 82-84 may facilitate detecting image elements 87-89 located on the opposite side 86 of substrate 81. Image elements 87-99 can be formed in the same manner as described in relation to FIG. 9. Each image element 87-89 may include an eight-channel OVD structure 60 as described above. The latter arrangement may produce a stereogram effect similar to that described with reference to FIG. 9.

Figure 11:
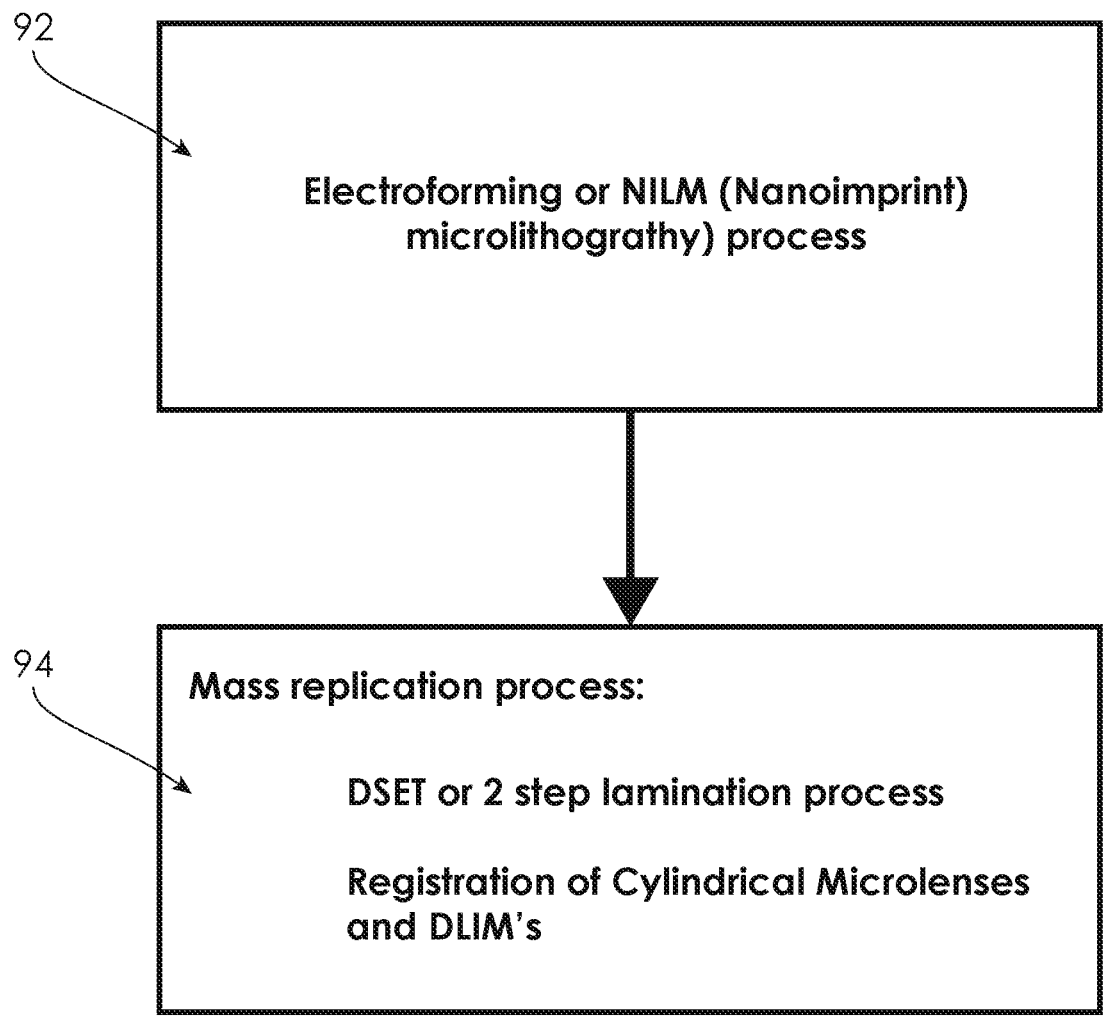
FIG. 11 shows a flow chart of a production process for an optical security device according to an embodiment of the present invention.

FIG. 11 shows a flow diagram of a method of creating the structures according to at least one aspect of the invention. Particularly, the structures required for both lenses and image elements are formed by electroforming or by nano-imprint microlithography in step 92. The structures created by the process in step 92 are then used, after creation into appropriate plates, or shims, to, preferably, emboss the structures into an appropriate medium, such as a radiation curable ink, in step 94. This can be done in the same in-line system in a method known as "Double Soft Emboss Technology" or DSET, or other similar technologies, such as that disclosed in WO2014070079 by Rolling Optics AB, which is hereby incorporated by reference. Alternatively, the structures for the lenses and image elements may be created separately and laminated together to form the final OVD.

As previously discussed above in the Summary of Invention section, the image may include a portrait of an object such as a human face and groups of image elements or channels may represent the object from many different viewpoints. Projectional views of the object may be captured so that the final stereogram produces an accurate three-dimensional image of that object. One technique for capturing stereograms is described in the previously referenced MIT paper entitled "The Generalized Holographic Stereogram" by Michael W. Halle:

http://www.media.mit.edu/spi/SPIPapers/halazar/halle91.pdf.

A simple stereogram model may consist of a single holographic plate including a series of thin vertical slit holograms exposed one next to the other across the plate. Each slit may be individually exposed to an image projected onto a rear-projection screen some distance away from the plate. Once the hologram is developed, each slit may form an aperture through which the image of the projection screen at the time of that slit's exposure may be seen. The images projected onto the screen may include views of a scene or an object captured from many different viewpoints.

Alternatively, a type of stereogram described in the prior art is similarly created from multiple two dimensional pictures of an object or scene, but taken along a horizontal path to capture multiple horizontal viewpoints of the object or scene. In this type of stereogram, the images thus captured are projected onto a holographic plate from the direction in which they were originally taken. In one method, a plate is exposed multiple times with a constant reference to the images captured above, sequentially. Another way to achieve an identical result is to create an intermediate hologram which contains the individual perspective images separated left to right. This intermediate hologram is then used as a master to project all the images back to a plate where the final hologram is created.

Of the above types of stereograms, the most appropriate for this invention is a variation of the method of individually capturing images. To create the image elements in groups which will be viewed through the focussing elements, images taken from different perspectives can be focused onto and projected through a series of slits onto a holographic plate. These slits must be spaced on the same centers as the focussing elements, and with a width equal to the individual focussing element width divided by the number of images captured or at any rate projected.

A simpler method to produce the frames appropriate for the groups of image elements described herein, is to digitally interleave the images captured above, resulting in an image element array identical to the one described immediately above. The above arrangement may address the shortcomings of prior art OVDs by relying on focussing elements to separate horizontal image channels. In particular the imaging properties of the focussing elements may not be dependent on the angle of incidence of illuminating light; rather the clarity of the image may be determined by the spatial relationship of the image elements to the focusing elements, which relationship may be fixed after embossing and may be independent of illumination.

Figure 12:
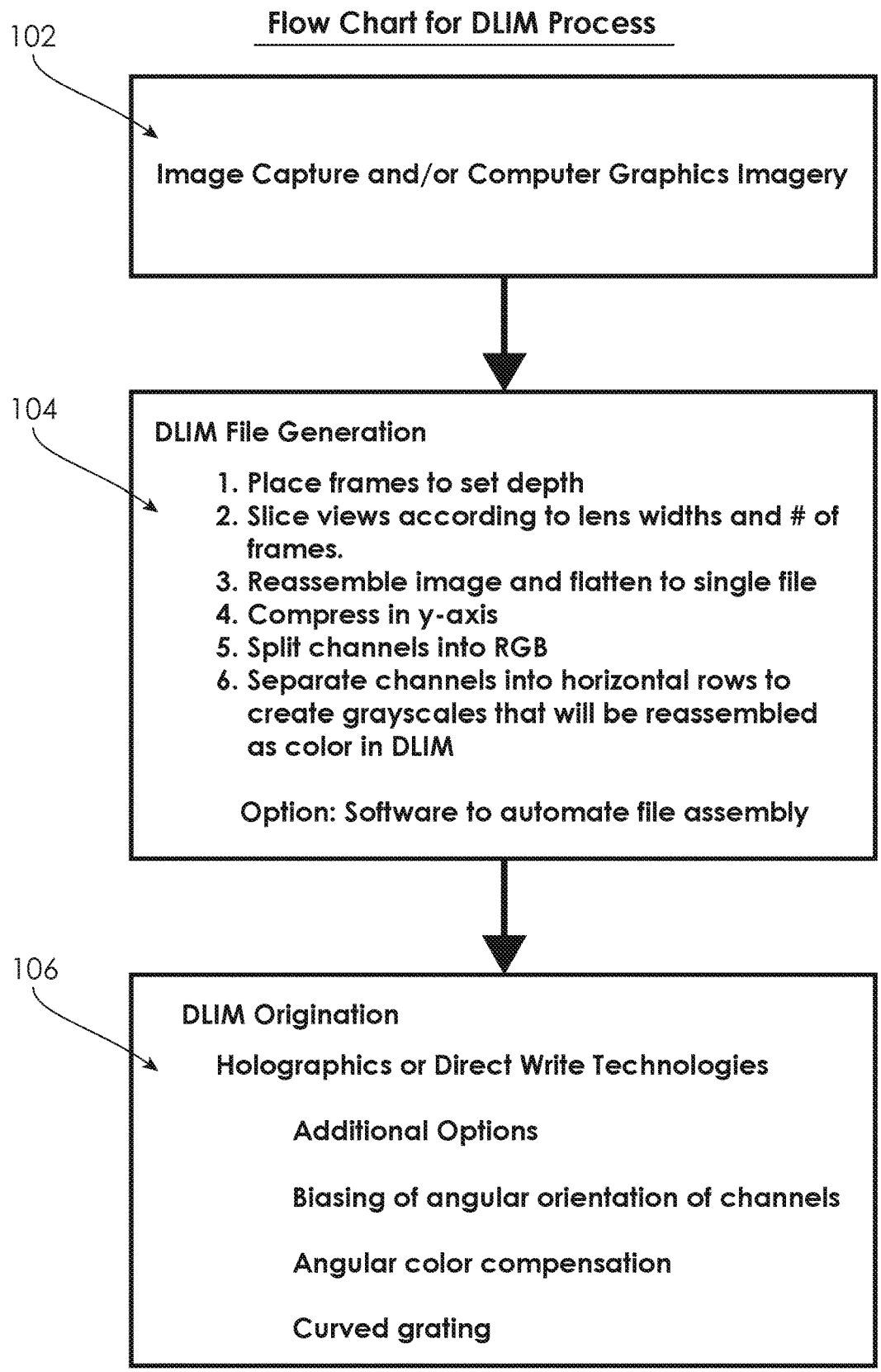
FIG. 12 shows a flow chart of a diffractive structure manufacture process associated with an optical security device according to an embodiment of the present invention.

FIG. 12 shows a flow diagram of a method of generating the image elements according to at least one aspect of the invention. Firstly, appropriate images are captured in step 102, as discussed in more detail below, as a series of frames. Secondly, the images are processed to be suitable for the image elements of the invention in step 104. This involves, in software:

1. Placing the frames to a set depth
2. Slicing into channels, according to lens widths and number of frames
3. Reassembling the image into a single interlaced image
4. Compressing in the y-axis
5. Splitting the channels into RGB
6. Splitting the channels into horizontal rows to create greyscale values which will be reassembled as color in the OVD Then, in step 106, the digital output of step 104, being a matrix of image elements, is originated to form a structure, such as in a plate or shim, which can be used to replicate the image elements for the OVD.

Figure 13:
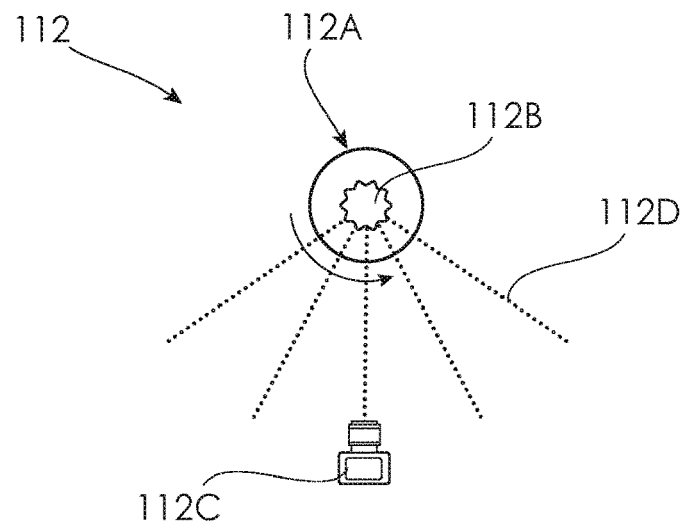
FIG. 13 shows three different methods appropriate for generating images according to the present invention.
Figure 13:
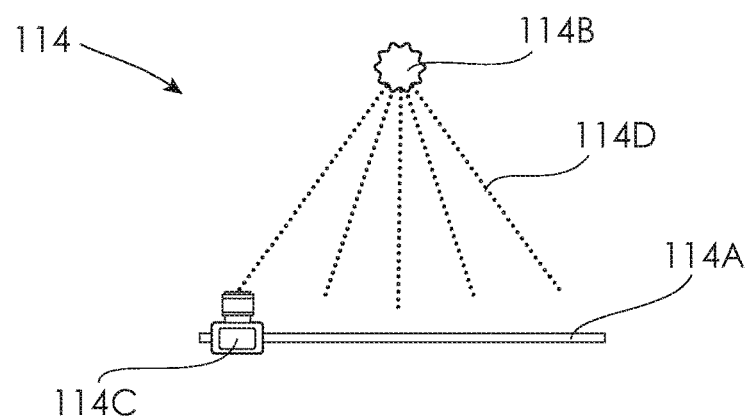
Figure 13:
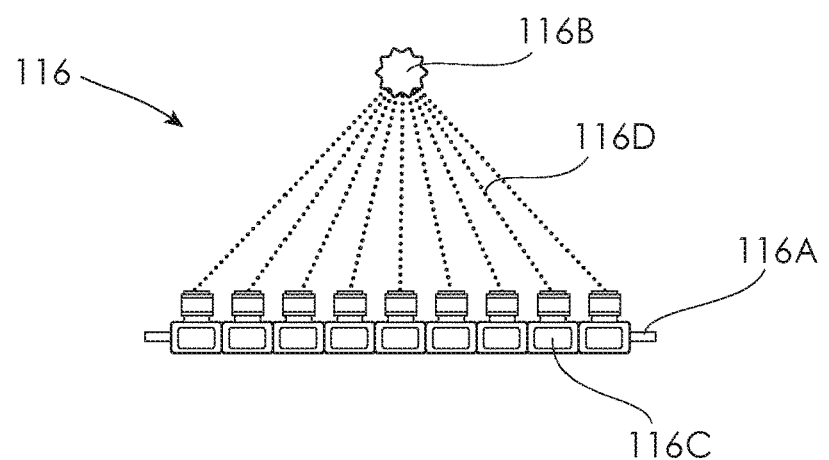

FIG. 13 shows three methods of capturing the collection of two dimensional images, or frames, taken from different perspectives that are required for holographic stereograms. One method 112 includes placing an object or person 112B on a turntable 112A and film it with a video or film camera 112C as it rotates. Images of the object or person 112B are captured from multiple perspectives 112D. Another method 114 includes placing a rail 114A in front of the scene/object/person 111B and driving a camera 114C along the rail 114A while it is recording video, film, or taking a series of images from different perspectives 114D. Another method 116 includes affixing a number of cameras 116C to the rail 116A in the configuration of method 114 and triggering all the cameras 116C simultaneously to capture images of the object 116B from different perspectives 116D.

Figure 14:
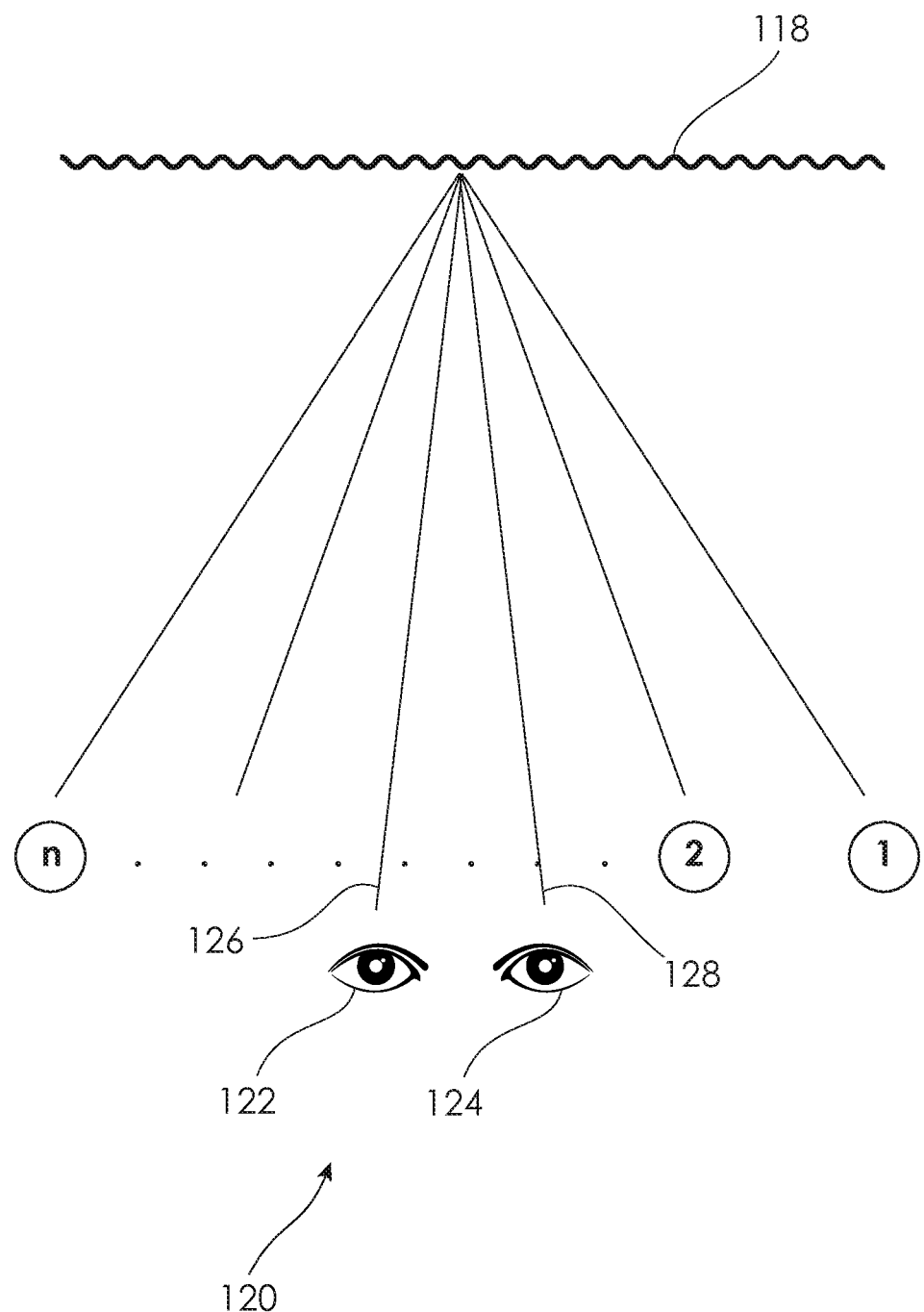
FIG. 14 shows how a device of the present disclosure is viewed by left and right eyes of a viewer.

As shown in FIG. 14, Each of these techniques may record a series of images taken from different perspectives (1, 2 . . . n), and when recombined holographically or multiplexed 118 for a lenticular stereogram, replay the perspective images from their original angles, allowing the viewer 120 to perceive the scene/object/person as three dimensional. The viewer's eyes 122, 124 may see two images from different perspectives 126, 128 because the images are replayed toward the original angles they were recorded from.

In holographic stereograms, the various perspective images are separated by being diffracted to the original angle from which they were recorded with the camera. Single and two step methods which have been used to achieve this end are well described in the literature.

One of the weaknesses of this type of holographic stereogram is that when an extended light source, e.g. fluorescent lighting, office lighting, overcast sky, is used to illuminate the hologram, the various perspectives become mixed together and the image becomes blurry and indistinct, at least any portions of the (3D) image which do not lie in the plane of the hologram.

In a 3D lenticular display, the various perspective views captured above are multiplexed together into an image matrix of interleaved vertical channels which are then printed with typical printing inks. An array of vertical cylindrical lenticules is then placed at roughly the focal length of the lenticules from this image matrix, and all the images channels associated with a particular angle are refracted in the same direction from the device, a direction which is unique for each perspective image. The multiplexed array may be arranged so that the images are in the correct order. For example, if only 4 perspective images were to be used, the array may be vertical slices of each image in the order 1, 2, 3, 4, 1, 2, 3, 4, 1, 2, 3, 4, 1, 2, 3, 4 . . . etc. and each set of four channels may lie under one lenticule.

A number of methods for creating the OVD of the present invention described above exist. In all embodiments, a series of perspective images as described above are obtained. In the preferred embodiment, those perspective images are aligned left to right in such a way that during reconstruction the 3D image is created at a predetermined depth relative to the device. As an example, a point on an object is selected to be on the surface. All the perspective images are shifted and/or cropped so that this point is in the same horizontal position in each image frame. Then the images are divided into columns, and interlaced into a final image file that consists of all the images arranged, for example, above, 1, 2, 3, 4, 1, 2, 3, 4, 1, 2, 3, 4, 1, 2, 3, 4 . . . numbered by perspective number. However, and to be clear, each column remains in the original position of the original perspective image (after the horizontal shift to set the image plane). For example, if the columns are numbered by the horizontal position in whichever file they were originally part of, the numbering would be: 1, 2, 3, 4, 5, 6, 7, 8, 9, 19, 10, 11, 12, 13, 14, 15 . . . .

Another less desirable and lower resolution interlacing technique yielding a dimensionally equivalent result to the above example (with 4 image perspectives) would be to use columns 1, 1, 1, 1, 4, 4, 4, 4, 8, 8, 8, 8, 12, 12, 12, 12 . . . .

One of the weaknesses of 3D lenticular displays is that the minimum width of the multiplexed slits is related to the resolution achievable by the printer, which forces the use of fewer images and/or larger lenticules than are ideal. However, these displays are not degraded by extended source lighting, and are equally sharp in diffuse and point source lighting.

The OVD device of the present invention addresses the disadvantages of both these 3D display technologies. Holography can record image elements that are on the order of a few wavelengths of light, therefore extremely narrow channels can be used in the device. This may allow the use of many more perspective images or frames than in a similar printed display: it may also allow the use of smaller lenticules, which increases the overall resolution of the image and makes the device thinner, easier to produce, and less costly. Because the 2D perspective images are multiplexed in the same way as they are in a printed 3D lenticular image, and because the lenticules redirect these images into the correct angles, the horizontal separation of the various perspectives is not affected by lighting and the image remains sharp under less than ideal lighting.

The embodiments of FIGS. 9 and 10 may produce a primary optical effect through focusing structures 72-74, 82-84 which focus on the back 76, 86 of substrates 71, 81 as described above but may also produce a secondary optical effect when image elements 77-79, 87-89 are viewed from the back of substrates 71, 81. Applicant believes that the secondary effect is caused by focusing structures 72-74, 82-84 providing surfaces which produce weak sampling by directing light in slightly greater preference back through the imagery. Moving the OVD device may change that point of preference in the imagery and cause the eye to see the OVD effect. Some light may be due to total internal reflection and some may be due to weak reflection that occurs from outer surfaces of focusing structures 72-74, 82-84. A protective coating, such as a transparent varnish may be applied over lenticular focusing structures 72-74, 82-84. The protective coating may be applied over the lenticular focusing structures 72-74, 82-84 as well as over other areas of substrate 71, 81 in which focusing structures 72-74, 82-84 are not present. The latter areas (not shown) may contain a 2D image that may be visible at least when the device is rotated about an axis perpendicular to the plane of the device or is rocked back and forth about an axis within the plane of the device. The 2D image may comprise a diffractive or non-diffractive structure such as a color changing ink.

Preferably, the protective coating includes a high refractive index (HRI) coating, as this may assist in ensuring that the optical effect produced by lenticular focusing structures 72-74, 82-84 remains visible even if the coating is applied in a thick layer which does not follow the contours of the lenses. However, in other embodiments possible coatings may include a transparent, non-high refractive varnish.

In a similar manner to the focussing structures, coatings may also be applied over the image elements 77-79, 87-89.

It may be appreciated that a suitable coating should demonstrate one or all of the following attributes including: good adhesion to the substrate, highly transparent, generally colorless, and robustness. Possible coatings may include a transparent, non-high refractive varnish. Varnish may denote a material that results in a relatively durable and protective finish. Exemplary transparent varnishes may include, but are not limited to, nitrocellulose and cellulose acetyl butyrate. Alternatively, the coating may include a high refractive index coating, being a coating having a metal oxide component of small particle size and high refractive index dispersed in a carrier, binder or resin. Such a high refractive index coating may contain solvent as it is a dispersion. Where a high refractive index coating of this type is used, it may be air cured or UV cured.

Alternatively, a high refractive index coating utilising a non-metallic polymer, such as Sulphur-containing or brominated organic polymers may also be used.

Advantages of the optical security device of the present invention may include:

1. Real 3D imagery may be mass produced with increased depth and clarity in a relatively inexpensive form that may be immediately integrated into existing banknote technology.
2. Detail provided by high resolution diffractive imagery may be much greater than is currently possible with high throughput print technologies.
3. 3D imagery may be easily differentiated from 2D imagery by a lay person. This and difficulties in counterfeiting or simulating such 3D imagery should result in improved security.
4. Grayscale 3D imagery generated from OVD's made using cost effective high volume fabrication techniques can be viewed from a broad range of viewing angles and with greater image resolution than color images in the RGB color space.
5. Further security hurdles for any counterfeiter may include:
    a) Obtaining first stage photographic imagery of a person or place;
    b) Developing OVD micro-technology to duplicate or simulate stereographic diffractive channels;
    c) Developing specific cylindrical microlenses required for the above;
    d) Registering microlenses accurately to stereographic imagery on a polymer substrate;
    e) Since portraiture is often used in banknote design, the image used may capture a specific person at a specific moment in time. This may significantly increase difficulty of mimicking a portrait.
6. Marriage of two previously separate 3D technologies, namely, microscopic lenticulars and diffractive image elements may facilitate creation of a product not possible up to now, namely a clear 3D portrait (or other image) on a bank note.

Finally, it is to be understood that various alterations, modifications and/or additions may be introduced into the constructions and arrangements of parts previously described without departing from the spirit or ambit of the invention.

The invention claimed is:
1. A security device including:
   a plurality of focusing elements;
   a plurality of image elements associated with each focusing element wherein said image elements include at least a first and a second group of image elements,
   wherein the plurality of image elements are located in an object plane to be viewable through the associated focusing element;
   wherein the plurality of image elements comprise sub-elements including red, green and blue sub-elements, which produce a predetermined primary colour upon illumination at predefined angles, wherein the sub-elements comprise diffraction grating elements or sub-wavelength grating elements which when illuminated by a light source generate a diffraction image observable at a range of viewing angles around the security device wherein a frequency and/or a pitch of the diffraction grating elements or sub-wavelength grating elements are different in the red, green and blue sub-elements; and wherein image elements of the first group are visible in a first range of viewing angles and image elements of the second group are visible in a second range of viewing angles.

2. A security device according to claim 1, wherein said plurality of image elements include three or more groups of image elements to represent an image observable from different viewing angles.

3. A security device according to claim 1, wherein the diffraction image is a greyscale or monochromatic image that includes a plurality of brightness levels across the image, and/or a color image that includes a plurality of colors.

4. A security device according to claim 1, wherein the red, green and blue sub-elements are vertically arranged in a strip, with the red sub-element being located at one end of the strip, the green sub-element being located in a middle section of the strip, and the blue sub-element being located at another end of the strip.

5. A security device according to claim 4, wherein the red, green and blue sub-elements are of a same physical size, with the grating elements of the red, green and blue sub-elements comprising a size distribution and/or a spatial distribution corresponding to grey levels or brightness levels associated with the sub-element.

6. A security device according to claim 1, wherein each of the sub-elements includes an effective grating area that includes the diffraction grating element or the sub-wavelength grating element, and a non-diffractive area that does not include any grating elements, and a brightness value of each sub-element is varied by changing the effective grating area within each sub-element and/or the non-diffractive area of the sub-element.

7. A security device according to claim 6, wherein the non-diffractive area within each of the red, green and blue sub-elements are of a same size for a given image element, to thereby generate a greyscale image, or wherein the non-diffractive area within each of the red, green and blue sub-elements are of a different size for a given image element, to thereby generate a color image.

8. A security device according to claim 6, wherein the non-diffractive area includes a microstructured surface with light traps for creating internal reflections of most incident light such that the incident light fails to reflect out and away from the light traps; or the non-diffractive area has a reflective coating for specular reflection of incident light; or the non-diffractive area has a light absorbing coating.

9. A security device according to claim 1, wherein each image element includes a plurality of randomized diffraction gratings, wherein each of the plurality of randomized diffraction gratings has a randomized grating pitch and/or width to diffract incident light at different angles, such that incident light diffracted from the plurality of randomized diffraction gratings is diffused and the diffraction image observable is a greyscale image.

10. A security device according to claim 9, wherein each image element includes an effective grating area that includes the diffraction grating elements or the sub wavelength grating elements, and a non-diffractive area that does not include any grating element, and a brightness value of each image element is varied by changing the effective grating area and/or the non-diffractive area of the image element.

11. A security device according to claim 1, wherein the diffraction grating elements or sub-wavelength grating elements are formed from a surface relief structure formed in a radiation curable ink, and wherein the focusing elements are formed from a radiation curable ink by printing and/or embossing.

12. A security device according to claim 1, wherein the focusing elements include refractive or diffractive part-cylindrical lenses or zone plates.

13. A security device according to claim 1, wherein the image elements are anamorphic, or the image elements are configured in a rectangular shape configuration, such that lengths of the image elements are greater than widths.

14. A security device according to claim 1, wherein the image observable is a three-dimensional image of a scene, object and/or a person.

15. A security device including:
a plurality of focusing elements;
a plurality of image elements located in an object plane to be viewable through the focusing elements, said image elements including at least first and second groups of image elements,
wherein each image element includes a surface structured for causing diffuse scattering of incident light, wherein the surface includes a randomized diffraction grating and/or an array of randomly arranged micromirrors,
wherein said plurality of image elements are arranged to generate an image observable when illuminated by the incident light, and
image elements of the first group are observable in a first range of viewing angles and image elements of the second group are observable in a second range of viewing angles.

16. A security device according to claim 15, wherein the randomized diffraction grating includes a random grating pitch to diffract light of a given wavelength at different angles such that white incident light diffracted from the random diffraction grating is diffused and the image observable is a greyscale image.

17. A security device according to claim 16, wherein each image element includes an effective grating area that includes the randomized diffraction grating element, and a non-diffractive area that does not include any grating element, and a brightness value of each image element is varied by changing the effective grating area and/or the non-diffractive area of the image element.

18. A security device according to claim 17, wherein the non-diffractive area includes any one or more of: a microstructured surface with light traps for creating internal reflections of most incident light that then fails to reflect out and away from the light traps, a reflective coating for specular reflection of incident light, and a light absorbing coating.

19. A security device according to claim 15, wherein the array of randomly arranged micromirrors cause incident light to be scattered in different directions.

* * * * *